United States Patent
Terayama

(10) Patent No.: US 8,887,004 B2
(45) Date of Patent: Nov. 11, 2014

(54) PERIODIC ERROR DETECTION METHOD AND PERIODIC ERROR DETECTION CIRCUIT

(75) Inventor: Tomoyuki Terayama, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 188 days.

(21) Appl. No.: 13/419,388

(22) Filed: Mar. 13, 2012

(65) Prior Publication Data

US 2013/0111276 A1    May 2, 2013

(30) Foreign Application Priority Data

Oct. 28, 2011  (JP) ................ P2011-236789

(51) Int. Cl.
  *G06F 11/00*  (2006.01)
  *G06F 11/22*  (2006.01)

(52) U.S. Cl.
  CPC ............... *G06F 11/2236* (2013.01)
  USPC ........................ 714/47.1; 714/55

(58) Field of Classification Search
  USPC ................................. 714/47.1
  See application file for complete search history.

(56) References Cited

U.S. PATENT DOCUMENTS

| 4,453,210 | A | * | 6/1984 | Suzuki et al. ............ 714/25 |
| 4,726,024 | A | * | 2/1988 | Guziak et al. ............ 714/24 |
| 4,903,193 | A | * | 2/1990 | Nakamura ............... 714/55 |
| 5,884,018 | A | * | 3/1999 | Jardine et al. ............ 714/4.5 |
| 5,892,895 | A | * | 4/1999 | Basavaiah et al. ........ 714/4.5 |
| 6,557,116 | B1 | * | 4/2003 | Swoboda et al. ......... 714/28 |
| 6,564,339 | B1 | * | 5/2003 | Swoboda et al. ......... 714/30 |
| 6,643,803 | B1 | * | 11/2003 | Swoboda et al. ........ 714/38.13 |
| 6,754,854 | B2 | * | 6/2004 | Kurrasch ............... 714/47.2 |
| 7,496,800 | B2 | * | 2/2009 | Koto et al. ............. 714/51 |
| 7,519,510 | B2 | * | 4/2009 | Koehler et al. .......... 702/186 |
| 7,711,996 | B2 | * | 5/2010 | Roy et al. .............. 714/55 |
| 8,115,427 | B2 | * | 2/2012 | Banta et al. ............. 318/400.01 |
| 2006/0277448 | A1 | * | 12/2006 | Koto et al. ............. 714/55 |
| 2012/0133319 | A1 | * | 5/2012 | Banta et al. ............. 318/652 |

FOREIGN PATENT DOCUMENTS

| JP | 07-142971 | 6/1995 |
| JP | 08-280189 | 10/1996 |

OTHER PUBLICATIONS

Chinese Office Action, Patent Application No. 201210066565.0, dated May 21, 2014.

* cited by examiner

*Primary Examiner* — Kamini Patel
(74) *Attorney, Agent, or Firm* — Patterson & Sheridan, LLP

(57) ABSTRACT

According to one embodiment, a method for detecting a periodic error, the method detecting a periodic processing error of a module controlled by a processor, the processor controlling a periodic processing by booting a peripheral module, the peripheral module outputting periodic triggers with a predetermined interval includes storing a first count value acquired from a counter, a second count value when the processing is started, and a third count value when the processing is completed, calculating a processing time on a basis of the three count values, and comparing the processing time with the predetermined interval to determine whether the periodic processing error occurs.

16 Claims, 8 Drawing Sheets

PERIODIC ERROR DETECTION METHOD AND PERIODIC ERROR DETECTION CIRCUIT

CROSS REFERENCE TO RELATED APPLICATION

This application is based upon and claims the benefit of priority from prior Japanese Patent Application No. 2011-236789, filed on Oct. 28, 2011, the entire contents of which are incorporated herein by reference.

FIELD

Exemplary embodiments described herein generally relate to a periodic error detection method and a periodic error detection circuit.

BACKGROUND

Conventionally, in a semiconductor device which executes periodic processing under the control of a processor, a peripheral module which periodically produces a periodic trigger has been booted in response to a boot command from the processor, and modules such as a co-processor start executing predetermined processing in response to the periodic trigger output from the peripheral module. In this processing, each module measures processing time and outputs completion notification to the processor when the processing is completed within a predetermined period.

On the other hand, when failing to complete the processing within the predetermined period, the module notifies the processor of "occurrence of periodic error" which is information indicating an overrun of the processing time. The processor notified of the occurrence of the periodic error performs abnormality processing.

Thus, the periodic error has conventionally been detected by the processing of each module as described above. However, in such detection, time required for the boot of the peripheral module and the completion notice, an overhead related to the processor processing, and the like are not taken into consideration.

Accordingly, even when the completion notice indicating normal processing is output from each module, the periodic processing may not be completed in time, in terms of the processing of the device as a whole. In such a case, the processor does not execute the abnormality processing and thus a serious fault may occur in the processing of the device as a whole.

DETAILED DESCRIPTION

Figure 1:
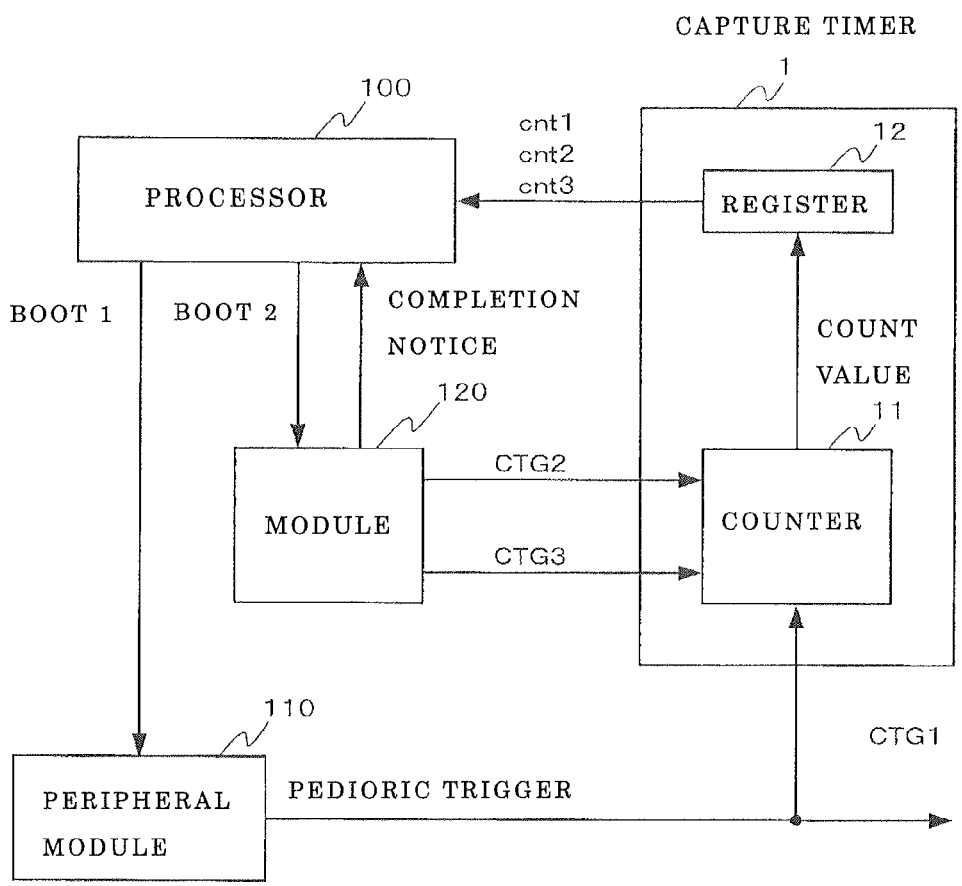
FIG. 1 is a block diagram showing an exemplary configuration of a processor control system in which a periodic error detection method is executed according to a first embodiment.

According to one embodiment, a method for detecting a periodic error, the method detecting a periodic processing error of a module, execution of processing of the module being controlled by a processor, the processor controlling a periodic processing by booting a peripheral module, the peripheral module outputting periodic triggers with a predetermined interval includes storing a first count value in a register included in a capture timer, the first count value being acquired from a counter included in the capture timer by outputting the periodic triggers as a first capture trigger into the capture timer, the counter performing an up-count operation with free-run storing a second count value in the register, the second count value being acquired from the counter by outputting a second capture trigger into the capture timer when the processing of the module is started, storing a third count value in the register, the third count value being acquired from the counter by outputting a third capture trigger into the capture timer when the processing of the module is completed, reading out the first count value, the second count value and the third count value from the register when the processor is received a complete notice from the module, calculating a processing time on a basis of the first count value, the second count value and the third count value, and comparing the processing time with the predetermined interval to determine whether the periodic processing error occurs.

According to another embodiment, a periodic error detection circuit includes a peripheral module outputting periodic triggers with a predetermined interval, a processor controlling periodic processing by booting the peripheral module, a module, execution of processing of the module being controlled by the processor, a capture timer including a counter and a register, the counter performing an up-count operation with free-run, the register storing a first count value, the first count value being acquired from the counter by outputting the periodic triggers as a first capture trigger, storing a second count value, the second count value being acquired from the counter by outputting a second capture trigger when the processing of the module is started, and storing a third count value, the third count value being acquired from the counter by outputting a third capture trigger when the processing of the module is completed, and a determination circuit connected between the processor and the capture timer, the determination circuit calculating a processing time on a basis of the first count value, the second count value and the third count value stored in the register comparing the processing time with the predetermined interval to determine whether the periodic processing error occurs, and outputting a determination result into the processor on request from the processor.

Embodiments will be described below with reference to the drawings. In the drawings, the same or corresponding portions are denoted by the same reference numeral and the description will not be repeated.

First Embodiment

FIG. 1 is a block diagram showing an exemplary configuration of a processor control system in which a periodic error detection method is executed according to a first embodiment.

The system includes a processor 100 which controls periodic processing, a peripheral module 110 which is booted by the processor 100 and outputs a periodic trigger at a predetermined period, and a module 120 of which the execution of processing is controlled by the processor 100. In the embodiment, the system includes a capture timer 1. The capture time 1 includes a counter 11 which is a free-run counter to perform an up-count operation and a register 12.

Figure 2:
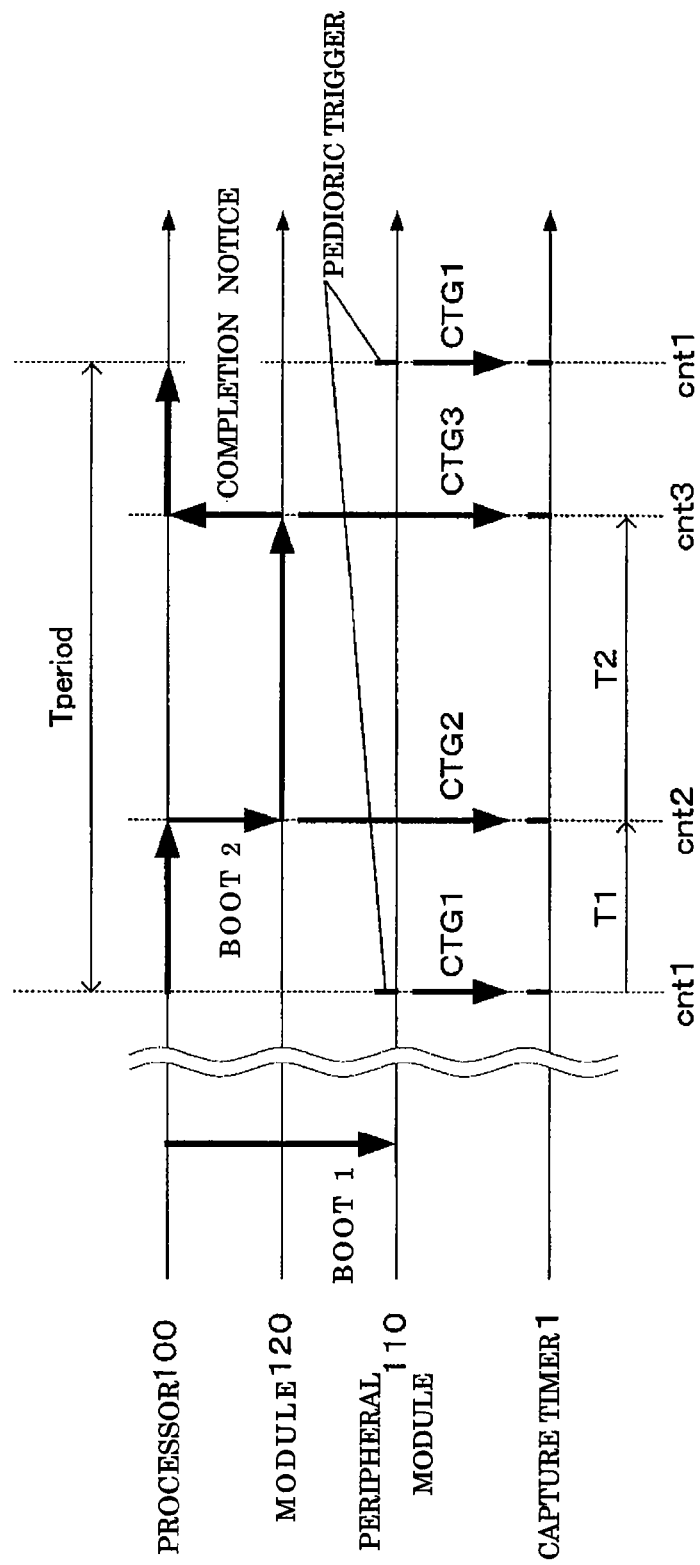
FIG. 2 is a diagram showing an exemplary operational sequence of the system in FIG. 1 according to a first embodiment.

An operational sequence of the system is described with an example shown in FIG. 2.

In response to boot (BOOT 1) by the processor 100, the peripheral module 110 outputs the periodic trigger at an interval of a predetermined control period Tperiod. The peripheral module 110 uses the periodic trigger as a capture trigger CTG1 to the capture timer 1 to periodically acquire a count value cnt1 from the counter 11. The acquired count value cnt1 is stored in the register 12.

Then, the processor 100 boots the module 120 (BOOT 2). In response to the boot, the module 120 starts the processing and outputs a capture trigger CTG2 to the capture timer 1 to acquire a count value cnt2 from the counter 11. The acquired count value cnt2 is stored in the register 12.

The module 120 performs the processing, and upon completing the processing, outputs a capture trigger CTG3 to the capture timer 1 to acquire a count value cnt3 from the counter 11. The acquired count value cnt3 is stored in the register 12.

Upon completing the processing, the module 120 also outputs "completion notice" to the processor 100.

Upon receiving the completion notice, the processor 100 reads out the count values cnt1, cnt2, and cnt3 from the register 12, calculates the processing time of the module 120 on the basis of the values, and compares the processing time with the control period Tperiod to determine whether the periodic processing error has occurred.

Figure 3:
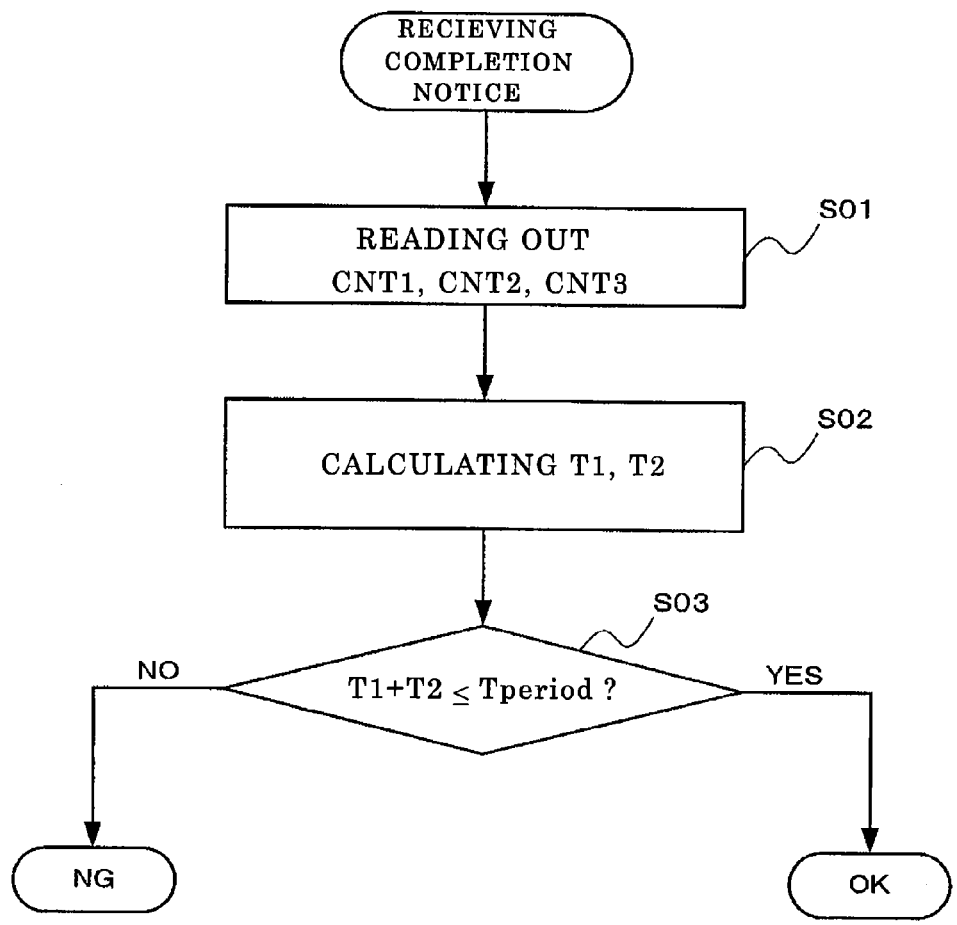
FIG. 3 is a diagram showing an exemplary flow chart of periodic error detection processing.

FIG. 3 shows a concrete processing flow chart for the determination of the occurrence of the periodic processing error.

Upon receiving the completion notice from the module 120, the processor 100 reads out the count value data pieces cnt1, cnt2, and cnt3 from the register 12 (Step S01).

Then, the processor 100 calculates $$T1 = cnt2 - cnt1, \text{ and}$$

$$T2 = cnt3 - cnt2.$$

Subsequently, the processor 100 calculates the sum (T1+T2) as the processing time of the module 120 (Step S02).

The time T1 represents a time period between a period edge which is a starting point of the period in which the processing of the module 120 is performed and the boot (BOOT 2) of the module 120. The time T2 represents a time period between the boot of the module 120 and the processing completion of the module 120.

Accordingly, the processing time (T1+T2) is a time period between the period edge which is the starting point of the period in which the processing of the module 120 is performed and the processing completion of the module 120.

Next, the processor 100 compares the processing time (T1+T2) with the control period Tperiod to determine whether the processing time (T1+T2) is equal to or shorter than the control period Tperiod (Step S03).

In the process, the processor 100 determines that the periodic processing error has not occurred (OK) when the processing time (T1+T2) is equal to or shorter than the control period Tperiod (YES), and determines that the periodic processing error has occurred (NG) when the processing time (T1+T2) is longer than the control period Tperiod (NO).

Figure 4:
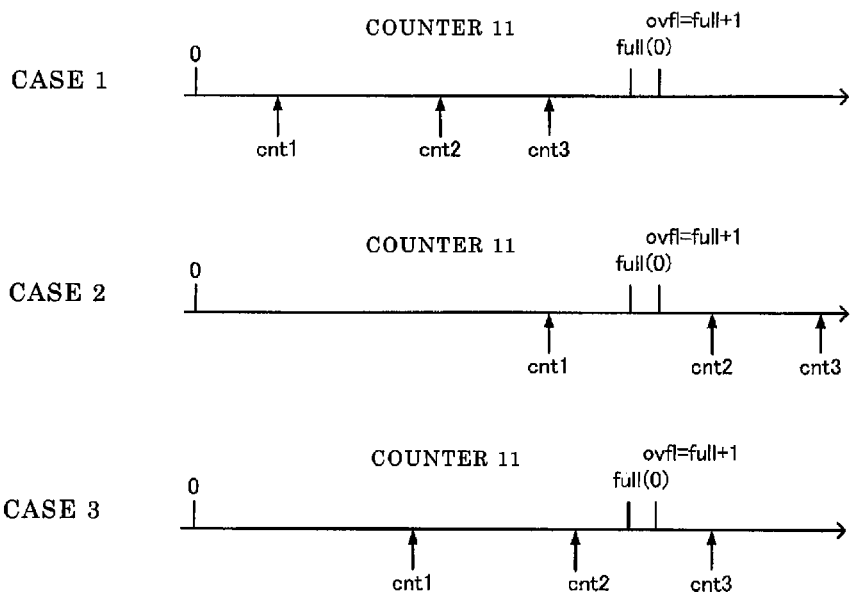
FIG. 4 is a diagram showing an exemplary periodic error detection program.

FIG. 4 is an exemplary description of a periodic error detection program PRGM1 which determines whether the periodic processing error has occurred.

If the periodic trigger output from the peripheral module 110 is asynchronous with the count start of the counter 11 of the capture timer 1, the periodic error detection program PRGM1 takes into account that the overflow of the count value occurs in the counter 11 during the processing of the module 120 and makes the "OK" determination when any of condition formulae (1) to (3) in FIG. 4 is satisfied.

As shown in Case 1, the condition formula (1) is a determination standard assuming a case where no overflow occurs in the counter 11 during the processing of the module 120.

As shown in Case 2, the condition formula (2) is a determination standard assuming a case where the overflow occurs in the counter 11 during a time period between the acquisition of the cnt1 and the acquisition of the cnt2.

When the overflow occurs, the count value of the capture timer 1 returns to 0 and reversal of count value occurs between cnt1 and cnt2. Thus, in the condition formula (2), T1 is calculated with an overflow value ovfl added to cnt2.

The overflow value ovfl is a value (ovfl=full+1) obtained by adding 1 to a full count value full of the counter 11.

As shown in Case 3, the condition formula (3) is a determination standard assuming a case where the overflow occurs in the counter 11 during a time period between the acquisition of cnt2 and the acquisition of cnt3.

In this case, the reversal of count value occurs between cnt2 and cnt3. Thus, in the condition formula (3), T2 is calculated with the overflow value ovfl added to cnt3.

Figure 5:
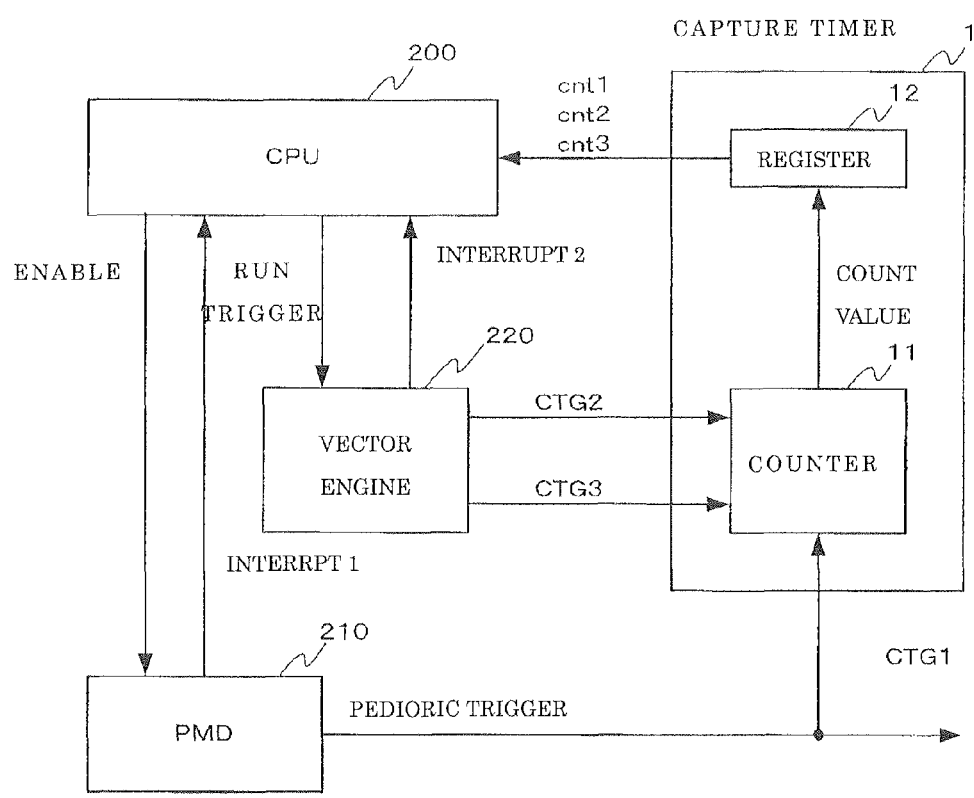
FIG. 5 is a block diagram showing an exemplary configuration of a motor control system in which the periodic error detection method is executed according to the first embodiment.

FIG. 5 shows an exemplary configuration of a motor control system as another example of the system in which the periodic error detection method according to the first embodiment is executed.

The motor control system shown in FIG. 5 includes a CPU 200 which controls periodic processing, a programmable motor driver (PMD) 210 which is a motor control circuit enabled by the CPU 200 and outputs a periodic trigger at a predetermined period, and a vector engine 220 of which the execution of the processing is controlled by the CPU 200. The motor control system also includes the capture timer 1.

The PMD 210 outputs a carrier signal serving as a standard for a motor driving signal and outputs the periodic trigger at a period based on the period of the carrier signal.

The vector engine 220 is hardware dedicated to automatically execute basic processing (coordinate axis conversion, phase conversion, and SIN/COS calculation) executed in a vector control of a motor and a PI control used in a current control.

Figure 6:
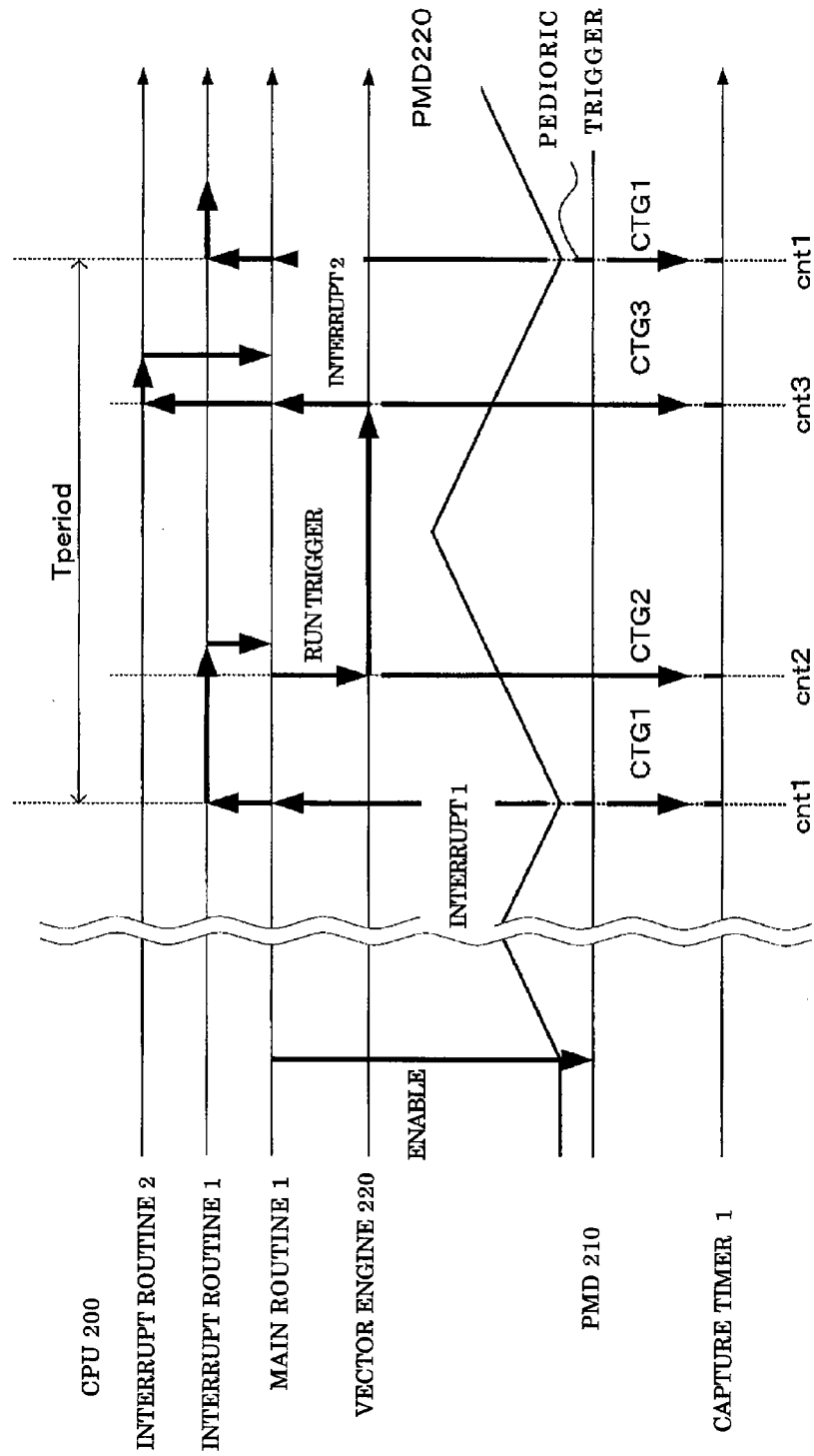
FIG. 6 is a diagram showing an exemplary operational sequence of the system in FIG. 5 according to the first embodiment.

Next, an operational sequence of the motor control system is described by using an example shown in FIG. 6.

The CPU 200 enables (ENABLE) the PMD 210 when executing a main routine. Upon being enabled, the PMD 210 starts outputting the carrier signal and outputs the periodic trigger at a predetermined interval of the control period Tperiod.

The PMD 210 uses the periodic trigger as the capture trigger CTG1 to the capture timer 1 to periodically acquire the count value cnt1 from the counter 11. The acquired count value cnt1 is stored in the register 12.

Then, the PMD 210 performs interruption (INTERRUPTION 1) to the CPU 200 when outputting a certain periodic trigger. In response to the interruption, the CPU 200 performs run trigger on an interruption routine 1.

The interruption routine 1 performs run trigger (RUN TRIGGER) to the vector engine 220 while being executed.

In response to the run trigger, the vector engine 220 starts the processing. During the processing, the vector engine 220 outputs the capture trigger CTG2 to the capture timer 1 to acquire the count value cnt2 from the counter 11. The acquired count value cnt2 is stored in the register 12.

The vector engine 220 performs the processing and outputs the capture trigger CTG3 to the capture timer 1 to acquire the count value cnt3 from the counter 11 upon completing the processing. The acquired count value cnt3 is stored in the register 12.

Upon completing the processing, the vector engine 220 also performs interruption (INTERRUPTION 2) to the CPU 200. The interruption serves as the "completion notice" to the CPU 200.

In response to this interruption, the CPU 200 performs run trigger on an interruption routine 2 and reads out the count value data pieces cnt1, cnt2, and cnt3 from the register 12.

The CPU 200 calculates the processing time of the vector engine 220 on the basis of the count value data pieces cnt1, cnt2, and cnt3 thus read out, and compares the processing time with the control period Tperiod to determine whether the periodic processing error has occurred.

The execution of the processing for determining whether the periodic processing error has occurred is the same as that in the processor control system described above and thus the description will be omitted.

According to such an embodiment, first, the capture triggers are output to the capture timer when the periodic trigger is output from the peripheral module, the module processing is started, and the module processing is completed, and the acquired count values are stored in the register. Then, upon receiving the completion notice from the module, the processor reads the register and calculates the processing time of the module from the stored count values to determine whether the periodic processing error has occurred. Thus, the time required to enabling the peripheral module and the completion notice, the overhead related to the processor processing, and the like are reflected on the calculation of the processing time of the module. Thus, the overrun of the processing time of the periodic processing can be surely detected. As a result, the serious fault can be prevented from occurring in the processing of the device as a whole.

Second Embodiment

In the first embodiment, the example is described in which whether the periodic error has occurred is determined by software. In a second embodiment, an example is described in which a determination circuit is provided and thus whether the periodic error has occurred is determined by hardware.

Figure 7:
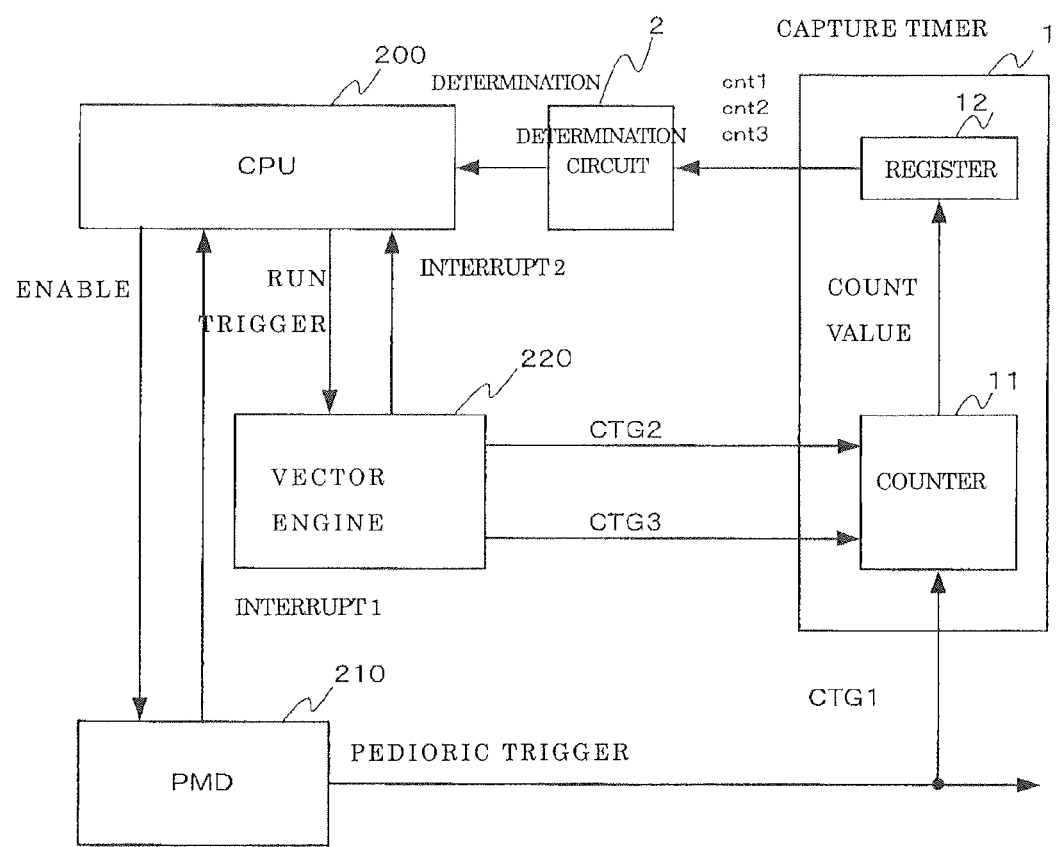
FIG. 7 is a block diagram showing an exemplary configuration of a motor control system including a periodic error detection circuit according to a second embodiment.

FIG. 7 is a block diagram showing an exemplary configuration of a motor control system including a periodic error detection circuit according to the embodiment.

The motor control system shown in FIG. 7 has a configuration in which a determination circuit 2 is added to the configuration shown in FIG. 5. Specifically, the periodic error detection circuit of the embodiment includes a capture timer 1 and the determination circuit 2. The operation of the capture timer 1 is same as that in the first embodiment and thus the description will be omitted.

The determination circuit 2 reads out count value data pieces cnt1, cnt2, and cnt3 stored in a register 12, calculates processing time of a vector engine 220 on the basis of the values, and compares the processing time with a control period Tperiod to determine whether the period processing error has occurred.

In the embodiment, the CPU 200 requests the determination circuit 2 to transmit the determination result when the completion notice is transmitted from the vector engine 220 through an interruption request (INTERRUPTION 2).

In response to the request, the determination circuit 2 transmits to the CPU 200, a determination result related to the occurrence of the periodic processing error.

Thus, the CPU 200 can detect the occurrence of the periodic processing error of the vector engine 220.

Figure 8:
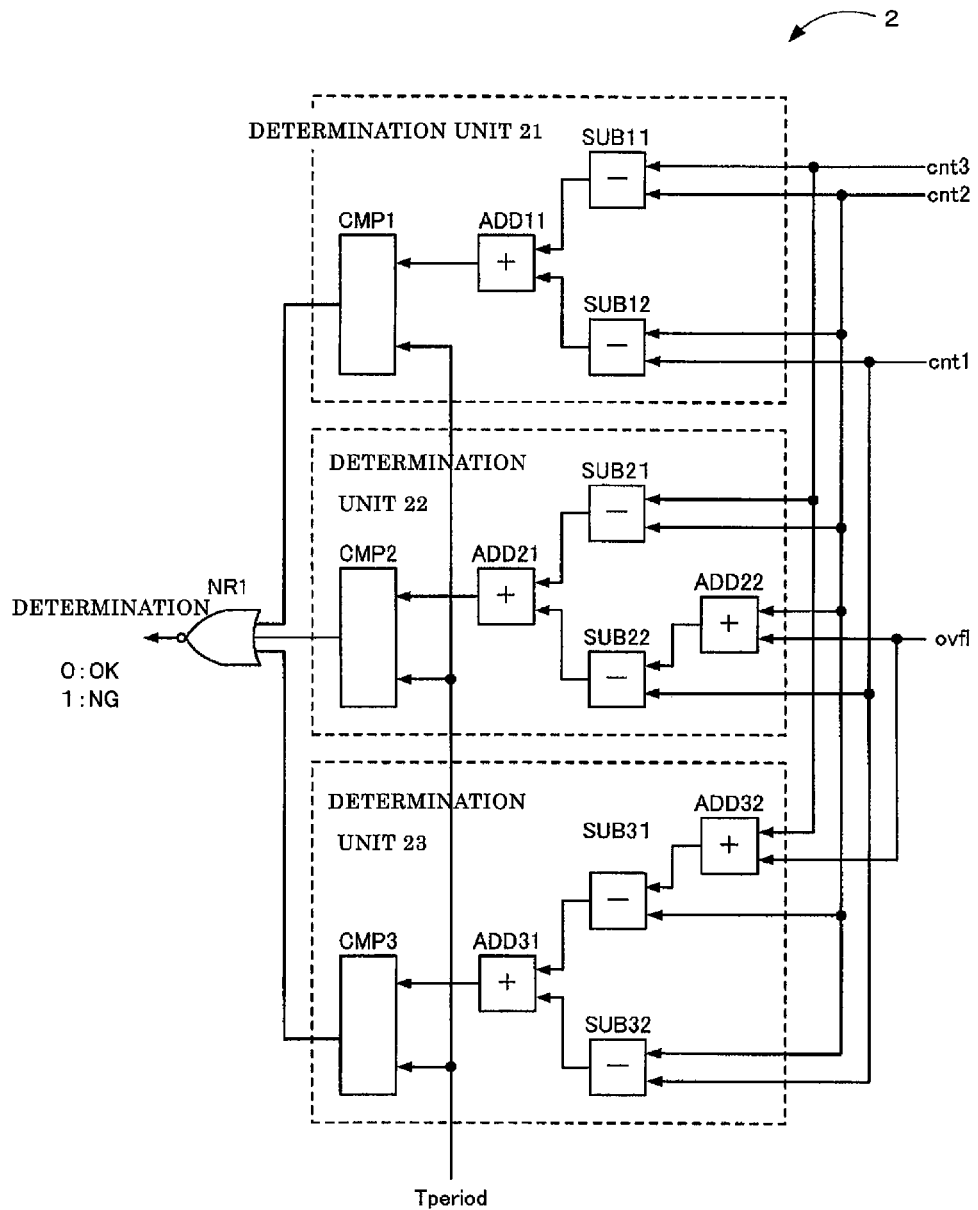
FIG. 8 is a circuit diagram showing an exemplary internal configuration of a determination circuit of the periodic error detection circuit according to the second embodiment.

FIG. 8 is a circuit diagram showing an exemplary internal configuration of the determination circuit 2. The circuit performs operations corresponding to condition formulae (1) to (3) of the periodic error detection program PRGM1 shown in FIG. 4. The determination circuit 2 includes determination units 21, 22, 23, each of the determination units 21, 22, 23 has at least two substructers, one adder, and one comparator.

Specifically, in a determination unit 21, the substructers 11, 12 and adder 11 perform the operation corresponding to the condition formula (1):

$$0 \leq (cnt2-cnt1)+(cnt3-cnt2) \leq Tperiod.$$

In a determination unit 22, the substructers 21, 22 and adder 21 perform the operation corresponding to the condition formula (2):

$$0 \leq (cnt2+ovfl-cnt1)+(cnt3-cnt2) \leq Tperiod.$$

In a determination unit 23, the substructers 31, 32 and adder 31 perform the operation corresponding to the condition formula (3):

$$0 \leq (cnt2-cnt1)+(cnt3+ovfl-cnt2) \leq Tperiod.$$

Comparators CMP1 to CMP3, each outputs "1" and "0" when the corresponding condition is satisfied and not satisfied, respectively.

Thus, a determination result output from an NOR gate NR1 to which the output from each of the comparators CMP1 to CMP3 is input indicates that "the periodic processing error has not occurred (OK) "when the output is "0" and indicates that "the periodic error has occurred (NG)" when the output is "1".

In the embodiment, the example is described in which the determination circuit 2 is provided in the motor control system. It is matter of course that the determination circuit 2 can also be provided in the processor control system shown in FIG. 1.

According to such an embodiment, the hardware determines whether the periodic processing error has occurred in the module such as the vector engine. Thus, the determination processing can be executed faster compared with a case where the determination is performed by the software. Accordingly, the procedure performed when an error occurs in the periodic processing can be executed promptly.

With the periodic error detection method and the periodic error detection circuit according to at least one of the above described embodiments, the overrun of the processing time of the periodic processing can be surely detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for detecting a periodic error, the method detecting a periodic processing error of a module, execution of processing of the module being controlled by a processor, the processor controlling a periodic processing by booting a peripheral module, the peripheral module outputting periodic triggers with a predetermined interval, comprising:

storing a first count value in a register included in a capture timer, the first count value being acquired from a counter included in the capture timer by outputting the periodic triggers as a first capture trigger into the capture timer, the counter performing an up-count operation with free-run;

storing a second count value in the register, the second count value being acquired from the counter by outputting a second capture trigger into the capture timer when the processing of the module is started;

storing a third count value in the register, the third count value being acquired from the counter by outputting a third capture trigger into the capture timer when the processing of the module is completed;

reading out the first count value, the second count value and the third count value from the register when the processor receives a complete notice from the module;

calculating a processing time by adding a first value to a second value, wherein the first value is equal to the second count value minus the first count value, and the second value is equal to the third count value minus the second count value;

comparing the processing time with the predetermined interval; and determining that the periodic processing error has occurred when the processing time is greater than or equal to the predetermined interval.

2. The method of claim 1, wherein
the processor includes and executes a periodic error detection program to determine an occurrence of the periodic processing error when the processing time is greater than or equal to the predetermined interval.

3. The method of claim 2, wherein the periodic error detection program includes a first function that, when executed,
calculates the processing time by adding the first value and the second value,
compares the processing time with the predetermined interval, and
based on the comparison, determines that the processing time is greater than or equal to the predetermined interval, wherein the determination indicates an occurrence of a periodic processing error.

4. The method of claim 3, wherein the periodic error detection program includes a second function that, when executed, detects an overflow of the counter and
determines the occurrence of the periodic processing error when each of the following inequalities is not satisfied:

$$0 \leq (cnt2+ovfl-cnt1)+(cnt3-cnt2) \leq T; \text{ and} \quad (1)$$

$$0 \leq (cnt2-cnt1)+(cnt3+ovfl-cnt2) \leq T, \quad (2)$$

wherein cnt1, cnt2, cnt3, ovfl, and T are, respectively, the first count value, the second count value, the third count value, an overflow value, and the predetermined interval.

5. The method of claim 1, wherein
a determination circuit connected between the processor and the capture timer determines an occurrence of the periodic processing error when the processing time is greater than or equal to the predetermined interval.

6. The method of claim 1, wherein
the peripheral module is a motor control circuit controlling motor driving and the module is a vector engine executing calculation on vector control of a motor.

7. The method of claim 6, wherein
the motor control circuit performs a first interruption to the processor when the periodic triggers are output, the processor enables the vector engine corresponding to the first interruption, and the vector engine performs a second interruption to the processor when the processing is completed.

8. A periodic error detection circuit, comprising:
a peripheral module outputting periodic triggers with a predetermined interval;
a processor controlling periodic processing by booting the peripheral module;
a module, execution of processing of the module being controlled by the processor;
a capture timer including a counter and a register, the counter performing an up-count operation with free-run, the register storing a first count value, the first count value being acquired from the counter by outputting the periodic triggers as a first capture trigger, storing a second count value, the second count value being acquired from the counter by outputting a second capture trigger when the processing of the module is started, and storing a third count value, the third count value being acquired from the counter by outputting a third capture trigger when the processing of the module is completed; and
a determination circuit connected between the processor and the capture timer, wherein the determination circuit is configured to:
calculate a processing time by adding a first value to a second value, wherein the first value is equal to the second count value minus the first count value, and the second value is equal to the third count value minus the second count value;
compare the processing time with the predetermined interval;
based on the comparison, determine that the periodic processing error has occurred when the processing time is greater than or equal to the predetermined interval.

9. The periodic error detection circuit of claim 8, wherein
the determination circuit including a first subtracter which subtracts the first count value from the second count value,
a second subtracter which subtracts the second count value from the third count value,
an adder which adds an input of the first subtracter and an input of the second subtracter to obtain the processing time,
and a comparator that compares the processing time with the predetermined interval to determine an occurrence of the periodic processing error when the processing time is equal to or greater than or equal to the predetermined interval.

10. The periodic error detection circuit of claim 8, wherein
the module is a vector engine executing calculation on vector control of a motor and the peripheral module is a motor control circuit controlling motor driving.

11. The periodic error detection circuit of claim 10, wherein
the motor control circuit performs a first interruption to the processor when the periodic triggers are output, the processor enables the vector engine corresponding to the first interruption, and the vector engine performs a second interruption to the processor when the processing is completed.

12. A periodic error detection circuit, comprising:
a peripheral module outputting periodic triggers with an predetermined interval;
a processor controlling periodic processing by booting a peripheral module and executing a periodic error detection program to determine an occurrence of a periodic processing error;
a module, execution of processing of the module being controlled by the processor;
a capture timer including a counter and a register, the counter performing an up-count operation with free-run, the register storing a first count value, the first count value being acquired from the counter by outputting the periodic triggers as a first capture trigger, storing a second count value, the second count value being acquired from the counter by outputting a second capture trigger when the processing of the module is started, and storing a third count value, the third count value being acquired from the counter by outputting a third capture trigger when the processing of the module is completed, wherein
the processor is configured to:
read the first count value, the second count value, and the third count value from the register upon receiving a completion notice from the module;
calculate a processing time by adding a first value to a second value, wherein the first value is equal to the second count value minus the first count value, and the second value is equal to the third count value minus the second count value;
compare the processing time with the predetermined interval; and
based on the comparison, determine that the periodic processing error has occurred when the processing time is greater than or equal to the predetermined interval.

13. The periodic error detection circuit of claim 12, wherein
the periodic error detection program includes a first function that, when executed, calculates the processing time by adding the first value to the second value and
compares the processing time to the predetermined interval to determine the occurrence of the periodic processing error when the processing time is greater than or equal to the predetermined interval.

14. The periodic error detection circuit of claim 13, wherein
the periodic error detection program further includes a second function that, when executed, detects an overflow of the counter and
determines the occurrence of the periodic processing error when each of the following inequalities is not satisfied:

$$0 \leq (cnt2 + ovfl - cnt1) + (cnt3 - cnt2) \leq T; \text{ and} \tag{1}$$

$$0 \leq (cnt2 - cnt1) + (cnt3 + ovfl - cnt2) \leq T, \tag{2}$$

wherein cnt1, cnt2, cnt3, ovfl, and T are, respectively, the first count value, the second count value, the third count value, an overflow value, and the predetermined interval.

15. The periodic error detection circuit of claim 12, wherein
the module is a vector engine executing calculation on vector control of a motor and the peripheral module is a motor control circuit controlling motor driving.

16. The periodic error detection circuit of claim 15, wherein
the motor control circuit performs a first interruption to the processor when the periodic triggers are output, the processor enables the vector engine corresponding to the first interruption, and the vector engine performs a second interruption to the processor when the processing is completed.

\* \* \* \* \*